Sept. 20, 1955     D. D. HILL     2,718,249

RETRACTIBLE TOOL

Filed April 15, 1953

INVENTOR.

Donald D. Hill.

BY Victor J. Evans & Co.

ATTORNEYS

United States Patent Office 2,718,249
Patented Sept. 20, 1955

2,718,249
RETRACTIBLE TOOL
Donald D. Hill, St. Louis, Mo.
Application April 15, 1953, Serial No. 348,930
1 Claim. (Cl. 145—64)

This invention relates to tools used by carpenters and others, and in particular a screw driver having a handle slidably mounted in a shank with a straight bit on one end and with a bit for a Phillips head screw on the opposite end and with means for locking the shank in extended positions, in retracted positions and also in positions with the ends reversed.

The purpose of this invention is to provide a combination screw driver that is adapted to be used for turning conventional screws of the type used in countersunk holes and also for turning screws of the type having Phillips heads.

Various methods have been used for providing combination screw drivers and also screw drivers with reversible shanks, however, it is difficult to hold a shank of a screw driver in retracted and extended positions and also in positions with the ends of the shank reversed, in which the shank is held with sufficient rigidity for turning screws in hard woods and the like. With this thought in mind this invention contemplates a screw driver having a shank with flat sides in which the shank is positioned between strips of rigid material, such as metal and in which the shank is held in both retracted and extended positions with a disc, the web of which meshes with a plurality of notches positioned around the shank of the screw driver.

The object of this invention is, therefore, to provide means for holding a shank of a combination screw driver whereby the shank is secured in selected positions with sufficient rigidity to enable use thereof for turning screws that are difficult to turn.

Another object of the invention is to provide a combination screw driver in which the shank is readily adjusted from one position to another without the use of other tools for retaining the parts in position.

A further object of the invention is to provide a combination or reversible screw driver which is of a simple and economical construction.

With these and other objects and advantages in view the invention embodies a screw driver having a handle with a longitudinally disposed opening extended therethrough and with metal lining strips on both sides of the opening, a shank having a straight bit on one end and a bit for a Phillips head screw on the opposite end and having notches extended through corners thereof and spaced from the ends, and a disc slidably mounted on the ends of the handle and positioned to engage the notches of the bit for retaining the bit in extended and also in retracted positions.

Other features and advantages of the invention will appear from the following description taken in connection with the drawing, wherein.

Figure 1:
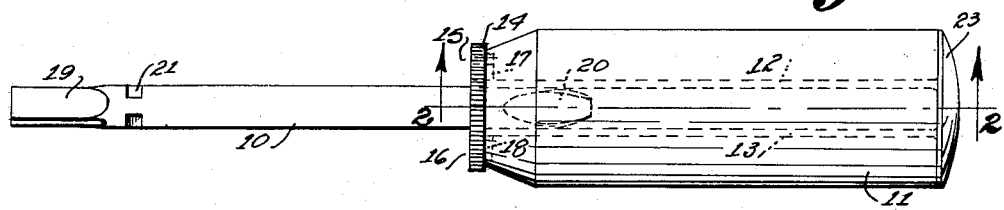
Figure 1 is a side elevational view illustrating the improved combination screw driver.

Referring now to the drawing wherein like reference characters denote corresponding parts the combination screw driver of this invention includes a shank 10, a handle 11 having wearing strips 12 and 13 extended therethrough and a lock disc 14 secured by screws 15 and 16 to flanges 17 and 18, respectively on the ends of the strips 12 and 13 whereby the disc is retained in operative positions against the end of the handle.

It will be understood that although the shank 10 is illustrated as being square in cross section, it may be formed of other shapes having flat sides.

In the design shown the shank 10 is provided with a flat bit 19 on one end and a bit 20 for Phillips head screws on the opposite end and the corners of the shank are provided with notches 21 which are spaced from the bit 19 and similar notches 22 which are spaced from the bit 20.

The strips 12 and 13, which are preferably formed of metal, extend from a head 23 and the flanges 17 and 18 on the opposite ends are provided with threaded openings 24 and 25, respectively which are positioned to receive the screws 15 and 16.

Figure 2:
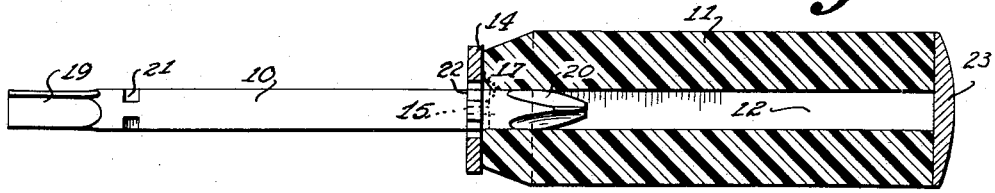
Figure 2 is a view showing a longitudinal section taken on line 2—2 of Fig. 1 with the shank shown in elevation.
Figure 4:
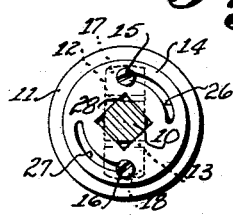
Figure 4 is a section taken on line 4—4 of Fig. 3 showing an end elevational view of the handle.
Figure 3:
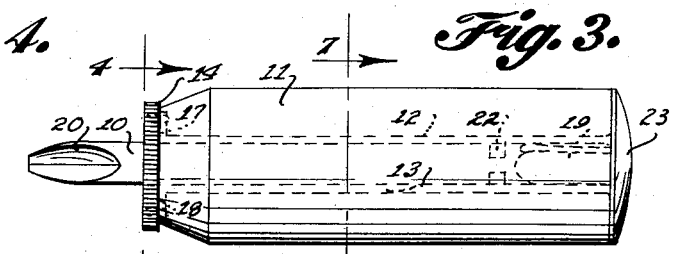
Figure 3 is a side elevational view of the screw driver in which the position of the shank is reversed in relation to that shown in Figs. 1 and 2 and also in which the shank is retracted.
Figure 5:
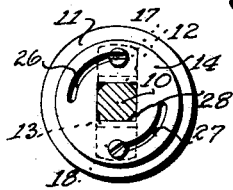
Figure 5 is a view similar to that shown in Fig. 4 showing the locking disc turned to an angle of 90 degrees.
Figure 6:
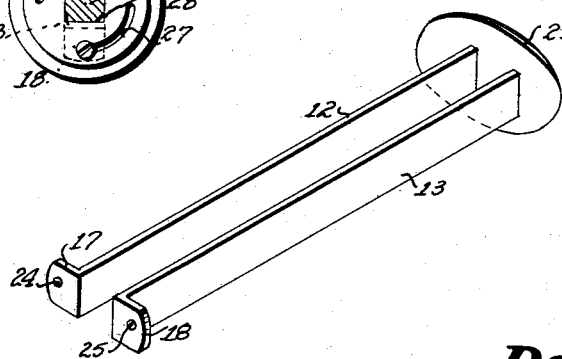
Figure 6 is a perspective view illustrating the lining strips used in the handle and showing the strips extended from a head adapted to be positioned at one end of the handle.
Figure 7:
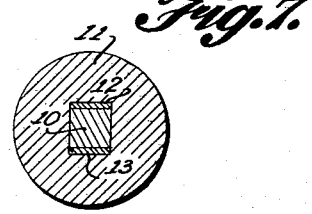
Figure 7 is a cross section through the handle taken on line 7—7 of Fig. 3.

The bit 14 is provided with elongated slots 26 and 27 through which the screws 15 and 16 extend and with the shank 10 extended as shown in Figs. 1 and 2, or retracted as shown in Fig. 3 the disc 14 may be rotated whereby side surfaces 28 of an opening through the disc move into the notches 21 or 22 to lock the bit in extended or retracted positions as may be desired. The thickness of the disc 14 is preferably slightly less than the width of the notches 21 and 22 whereby the disc may readily be turned from one position to another.

With the disc 14 positioned whereby the opening therein registers with the opening between the strips 12 and 13 in the handle the shank 10 may be withdrawn and the position thereof reversed.

With the parts arranged in this manner the shank or bit of the screw driver is rigidly held with side surfaces thereof in engagement with the inner surfaces of the strips 12 and 13 whereby the screw driver may be used with the shank in extended or retracted positions.

It will be understood that modifications, within the scope of the appended claim, may be made in the design and arrangement of the parts without departing from the spirit of the invention.

What is claimed is:

In a screw driver, a handle provided with a longitudinally extending centrally arranged opening, a pair of spaced, parallel strips extending through said opening, a head arranged contiguous to an end of said handle and secured to one end of said strips, flanges extending outwardly at right angles from the ends of said strips, there being apertures arranged in said flanges, a disc provided with a pair of curved slots, securing elements extending through said slots and through the apertures in said flanges, said disc being provided with a central opening therein, a shank projecting through the opening in said disc and having a screw driver bit on one end thereof, the outer periphery of said disc being knurled, there being notches in said shank spaced from the ends of said shank for engagement by said disc, the thickness of said disc being slightly less than the width of said notches.

References Cited in the file of this patent
UNITED STATES PATENTS

| | | |
|---|---|---|
| 1,269,413 | Finnigan | June 11, 1918 |
| 1,429,861 | Flodin | Sept. 19, 1922 |
| 2,592,978 | Trimboli | Apr. 15, 1952 |

FOREIGN PATENTS

| | | |
|---|---|---|
| 412,988 | Italy | Mar. 14, 1946 |